(12) United States Patent
Wang et al.

(10) Patent No.: US 8,039,076 B2
(45) Date of Patent: Oct. 18, 2011

(54) DYE AND RECORDING MEDIA UTILIZING THE SAME

(75) Inventors: Shin-Shin Wang, Hsinchu (TW); Wen-Ping Chu, Taichung (TW); Chien-Liang Huang, Taoyuan County (TW); Wen-Yih Liao, Taichung (TW); Hui-Ping Tsai, Hsinchu (TW); Jong-Lieh Yang, Hsinchu (TW); An-Tse Lee, Taipei County (TW)

(73) Assignee: Industrial Technology Research Institute, Hsinchu (TW)

( * ) Notice: Subject to any disclaimer, the term of this patent is extended or adjusted under 35 U.S.C. 154(b) by 1029 days.

(21) Appl. No.: 11/645,668

(22) Filed: Dec. 27, 2006

(65) Prior Publication Data
US 2008/0160244 A1    Jul. 3, 2008

(51) Int. Cl.
*G11B 7/24* (2006.01)
*C07D 403/06* (2006.01)

(52) U.S. Cl. ........................ 428/64.8; 544/296
(58) Field of Classification Search .................. None
See application file for complete search history.

(56) References Cited

U.S. PATENT DOCUMENTS

| | | | | |
|---|---|---|---|---|
| 4,412,231 A | * | 10/1983 | Namba et al. | 346/135.1 |
| 4,767,693 A | * | 8/1988 | Oba et al. | 430/270.19 |
| 5,965,333 A | * | 10/1999 | Chen et al. | 430/351 |
| 2006/0188789 A1 | | 8/2006 | Takizawa et al. | |
| 2008/0090174 A1 | * | 4/2008 | Mikoshiba et al. | 430/270.11 |
| 2009/0029092 A1 | * | 1/2009 | Watanabe et al. | 428/64.8 |

FOREIGN PATENT DOCUMENTS

| WO | WO 2006 001460 | * | 1/2006 |
|---|---|---|---|
| WO | WO 2006/101177 | * | 9/2006 |

* cited by examiner

*Primary Examiner* — Kathleen Duda
*Assistant Examiner* — Anna L Verderame
(74) *Attorney, Agent, or Firm* — Birch, Stewart, Kolasch & Birch, LLP

(57) ABSTRACT

The invention provides dyes for optical disc recoding media, having the general formula:

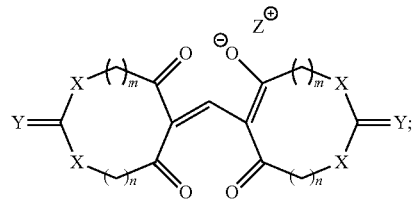

wherein m, n is independently selected from integers 0-3; X represents oxygen, sulfur, C—$R_1$, or N—$R_2R_3$; Y is oxygen or sulfur; each of $R_1$, $R_2$, and $R_3$ can be the same or different; and $Z^\oplus$ is a cation. The dyes have a maximum absorption in wavelength of 300-500 nm and can be used in recording layers of high density optical disc recording media.

9 Claims, 1 Drawing Sheet

DYE AND RECORDING MEDIA UTILIZING THE SAME

BACKGROUND OF THE INVENTION

1. Field of the Invention

The invention relates to dyes, and in particular to dyes applied in optical recording media.

2. Description of the Related Art

With popularization of high-definition video and other multimedia formats with large file size, storage capacities of conventional recording media such as CD-R (650 MB) and DVD-R (4.7 GB), are insufficient. Next generation blue ray discs utilizes blue laser (405 nm) as read/write source, providing a mono layer storage capacity exceeding 15 GB.

In Japanese Pat. Pub. No. 200196918, coumarin derivatives are applied to serve as optical recording media dyes. The recording wavelength of the dye is 320-500 nm. When utilizing blue laser (405 nm) to record, however, its reflectivity exceeds 50%.

In Japanese Pat. Pub. No. 20022117, stilbene is applied to serve as optical recording media dye. The recording wavelength of the dye is 350-530 nm. When utilizing blue laser (405 nm) to record, its absorption coefficient ($\in$) is from $2.6*10^4$ to $3.5*10^4$.

U.S. Pat. No. 6,815,033 discloses an optical recording media dye. The recording wavelength of the dye is 350-530 nm. When utilizing blue laser (405 nm) to record, its absorption coefficient ($\in$) is from $1.7*10^4$ to $4.2*10^4$.

In U.S. Pat. No. 6,576,321, azaporphyrin metal complex dye is applied to serve as optical recording media dye. The recording wavelength of the dye is 350-500 nm. When utilizing blue laser (405 nm) to record, its carrier to noise ratio (CNR) exceeds 50 dB.

U.S. Pat. No. 6,800,347 discloses an optical recording media dye. The recording wavelength of the dye is 350-500 nm. When utilizing blue laser (405 nm) to record, its CNR exceeds 50 dB.

In U.S. Pat. No. 6,379,768, amine with conjugated double bonds is applied to serve as optical recording media dye. The recording wavelength of the dye is less than 550 nm. When utilizing blue laser (405 nm) to record, its reflectivity exceeds 60%.

Although several optical recording media dyes have been disclosed, dyes providing high thermal stability, CNR, read/write speed, and sensitivity are still called for.

BRIEF SUMMARY OF THE INVENTION

The invention provides a dye for use in optical recording media, having a general formula:

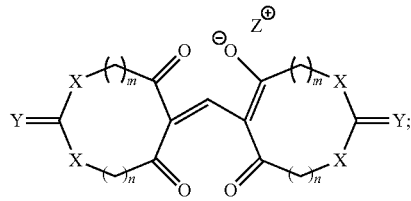

wherein m, n is independently selected from integers 0-3; X represents oxygen, sulfur, N—$R_1$, or C—$R_2R_3$; Y represents oxygen or sulfur; each of $R_1$, $R_2$, and $R_3$ can be same or different groups including hydrogen, alkyl, substituted alkyl, cycloalkyl, substituted cycloalkyl, alkoxy, substituted alkoxy, phenyl, substituted phenyl, benzyl, substituted benzyl, halogen, and $Z^{\oplus}$ is a cation.

The invention provides another dye used in optical recording media, having a general formula:

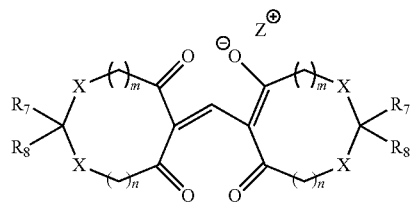

wherein m, n is independently selected from integers 0-3; X represents oxygen, sulfur, N—$R_4$, or C—$R_5R_6$; each of $R_4$, $R_5$, $R_6$, $R_7$, and $R_8$ can be same or different groups including hydrogen, alkyl, substituted alkyl, cycloalkyl, substituted cycloalkyl, alkoxy, substituted alkoxy, phenyl, substituted phenyl, benzyl, substituted benzyl, halogen, and $Z^{\oplus}$ is a cation.

The invention provides yet another dye used in optical recording media, having a general formula:

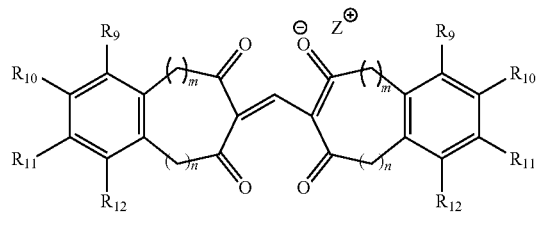

wherein m, n is independently selected from integers 0-3; each of $R_9$, $R_{10}$, $R_{11}$, $R_{12}$ can be same or different groups including hydrogen, alkyl, substituted alkyl, cycloalkyl, substituted cycloalkyl, alkoxy, substituted alkoxy, phenyl, substituted phenyl, benzyl, substituted benzyl, halogen, nitro, carboxyl ester, keto, sulfonyl, sulfonyl ester; and $Z^{\oplus}$ comprises a cation.

The invention further provides a high density optical recording medium, comprising a substrate with a recording layer thereon capable of recording information by irradiation by a laser beam with a wavelength of 300 to 500 nm; wherein the recording layer comprises the dyes disclosed.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 2:
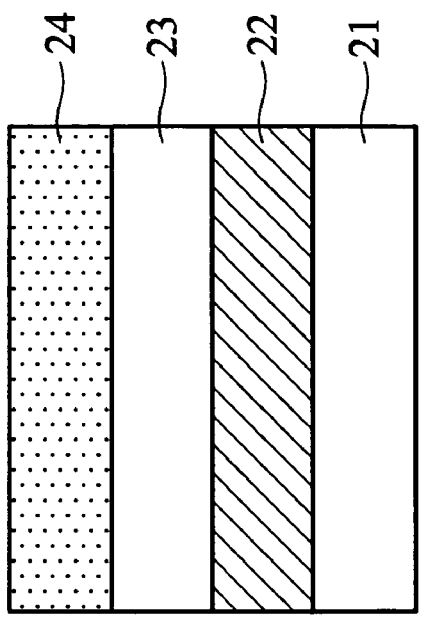
FIG. 2 is a cross section of a BDR structure of the invention.

The following description is the best-contemplated mode of carrying out the invention. This description is made for the purpose of illustrating the general principles of the invention and should not be taken in a limiting sense. The scope of the invention is best determined by reference to the appended claims.

The invention provides a dye used in optical recording media, having a general formula:

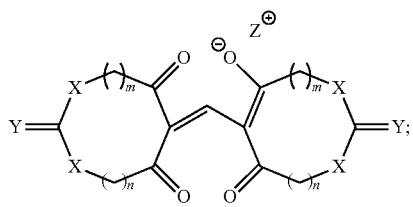

(I)

wherein m, n is independently selected from integers 0-3; X represents oxygen, sulfur, N—$R_1$, or C—$R_2R_3$; Y represents oxygen or sulfur; each of $R_1$, $R_2$, and $R_3$ can be same or different groups including hydrogen, alkyl, substituted alkyl, cycloalkyl, substituted cycloalkyl, alkoxy, substituted alkoxy, phenyl, substituted phenyl, benzyl, substituted benzyl, halogen, and $Z^\oplus$ is a cation. Alkyl, substituted alkyl, cycloalkyl, substituted cycloalkyl, alkoxy, substituted alkoxy are preferably $C_{1-10}$ and more preferably $C_{1-6}$. In further embodiment, alkyl, substituted alkyl, alkoxy, substituted alkoxy are preferably $C_{1-3}$.

The synthesis dye I is described in formula II as:

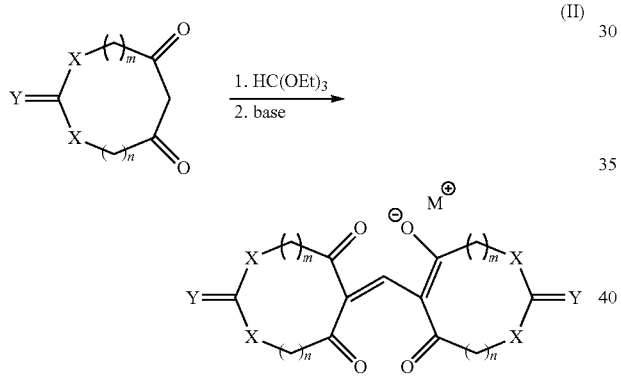

(II)

In formula II, the base may be common MOH or $M_2CO_3$. $M^\oplus$ corresponds to the metal ion of the base, such as sodium ion to sodium carbonate or potassium ion to potassium hydroxide, respectively. To enhance solubility of the dye, the $M^\oplus$ can be substituted to $Z^\oplus$ to form dye I. $Z^\oplus$ is preferably a quaternary ammonium salt, and more preferably an aromatic quaternary ammonium salt.

The invention provides another dye used in optical recording media, having a general formula:

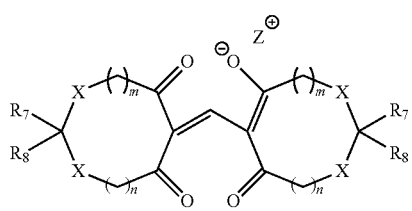

(III)

wherein m, n is independently selected from integers 0-3; X represents oxygen, sulfur, N—$R_4$, or C—$R_5R_6$; each of $R_4$, $R_5$, $R_6$, $R_7$, and $R_8$ can be same or different groups including hydrogen, alkyl, substituted alkyl, cycloalkyl, substituted cycloalkyl, alkoxy, substituted alkoxy, phenyl, substituted phenyl, benzyl, substituted benzyl, halogen, and $Z^\oplus$ is a cation. Alkyl, substituted alkyl, cycloalkyl, substituted cycloalkyl, alkoxy, substituted alkoxy are preferably $C_{1-10}$ and more preferably $C_{1-6}$. In further embodiment, alkyl, substituted alkyl, alkoxy, substituted alkoxy are preferably $C_{1-3}$.

The synthesis dye III is described in formula IV as:

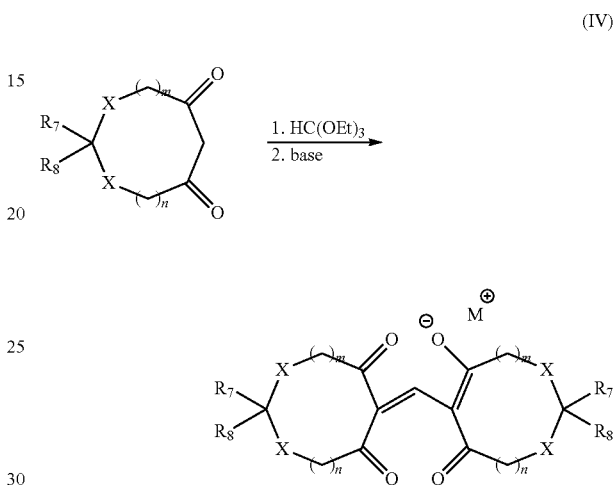

(IV)

Similar to the synthesis strategy of dye I, in formula IV, the base may be common MOH or $M_2CO_3$. $M^\oplus$ corresponds to the metal ion of the base, such as sodium ion to sodium carbonate or potassium ion to potassium hydroxide, respectively. To enhance solubility of the dye, the $M^\oplus$ can be substituted to $Z^\oplus$ to form dye III. $Z^\oplus$ is preferably a quaternary ammonium salt, and more preferably an aromatic quaternary ammonium salt.

The invention provides yet another dye used in optical recording media, having a general formula:

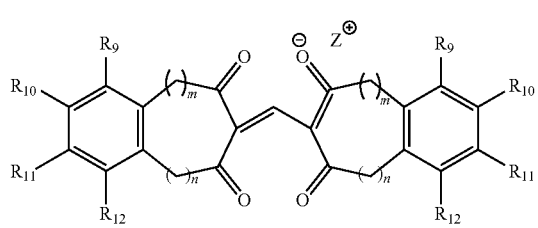

(V)

wherein m, n is independently selected from integers 0-3; each of $R_9$, $R_{10}$, $R_{11}$, $R_{12}$ can be same or different groups including hydrogen, alkyl, substituted alkyl, cycloalkyl, substituted cycloalkyl, alkoxy, substituted alkoxy, phenyl, substituted phenyl, benzyl, substituted benzyl, halogen, nitro, carboxyl ester, keto, sulfonyl, sulfonyl ester; and $Z^\oplus$ is a cation. Alkyl, substituted alkyl, cycloalkyl, substituted cycloalkyl, alkoxy, substituted alkoxy are preferably $C_{1-10}$ and more preferably $C_{1-6}$. In further embodiment, alkyl, substituted alkyl, alkoxy, substituted alkoxy are preferably $C_{1-3}$.

The synthesis dye V is described in formula VI as:

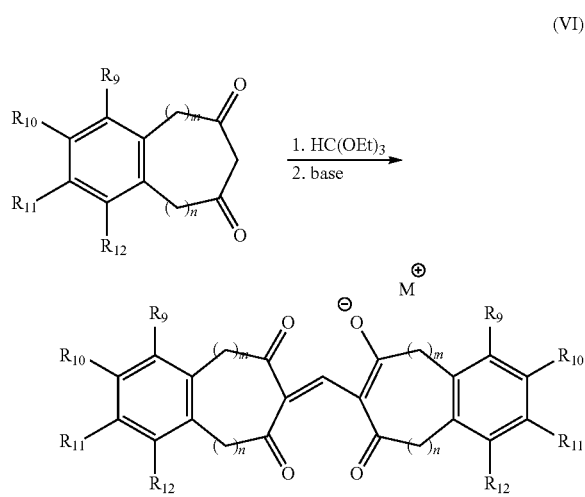

(VI)

Similar to the synthesis strategy of dye I, in formula VI, the base may be common MOH or $M_2CO_3$. $M^{\oplus}$ corresponds to the metal ion of the base, such as sodium ion to sodium carbonate or potassium ion to potassium hydroxide, respectively. To enhance solubility of the dye, the $M^{\oplus}$ can be substituted to $Z^{\oplus}$ to form dye V. $Z^{\oplus}$ is preferably a quaternary ammonium salt, and more preferably an aromatic quaternary ammonium salt.

Figure 1:
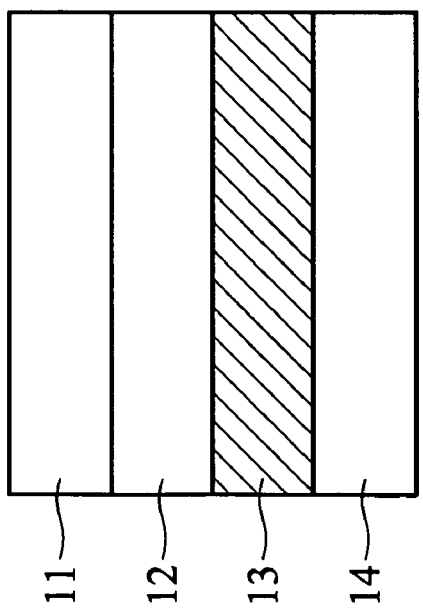
FIG. 1 is a cross section of a HD-DVD-R structure of the invention.

The major application of dyes I, III, and V is in the recording layer of optical recording media. There are two major methods to form a blue ray disc. FIG. 1 shows a high density digital versatile disc recorder (HD-DVD-R) standard. The fabrication process comprises providing a transparent substrate 11, dissolving the optical recording media dye of the invention in an organic solvent, and coating the dye solution on the substrate, baking the dye solution layer to form a recording layer 12 of the media, sputtering reflective material on the recording layer 12 to form a reflective layer 13, and adhering another transparent substrate 14 onto the transparent substrate 11 to form the HD-DVD-R, with recording layer 12 and the reflective layer 13 therebetween.

FIG. 2 shows a blue-ray disc recorder (BDR) standard. The fabrication process includes providing a transparent substrate 21, sputtering reflective material on the transparent substrate 21 to form a reflective layer 22, dissolving the optical recording media dye of the invention in an organic solvent, and coating the dye solution on the reflective layer 22, baking the dye solution layer to form a recording layer 23 of the optical recording media, and coating a cover layer 24 on the recording layer 23 to form the BDR.

The first transparent substrates 11 and 21 have trenches. The second transparent substrate 14 has no trench. Suitable materials of the transparent substrate can be polyester, polycarbonate, poly methyl methacrylate (PMMA), metallocene based cyclic olefin copolymer (mCOC). Due to high transmission under wavelength less than 450 nm, the mCOC is suitable for the substrate of the blue ray disc of the invention. The reflective layer 13 and 22 may comprise Au, Ag, Al, Si, Cu, Cr, Ti, or alloys thereof. The organic solvent used to dissolve the dye can be $C_{1-6}$ alcohol, $C_{1-6}$ ketone, $C_{1-6}$ ether dibutyl ether, halogen compound, or amide. The $C_{1-6}$ alcohol includes methanol, ethanol, isopropanol, diacetonalchol (DAA), $C_{1-6}$ ether alcohol, 2,2,3,3-tetrafluoropropanol, trichloroethanol, 2-chloroethanol, octafluoropentanol, or hexafluorobutanol. $C_{1-6}$ ketone can be acetone, methyl isobutyl ketone (MIBK), methyl ethyl ketone (MEK), propylene glycol monoethyl ether (PGME), propylene glycol monoethyl acetate (PGMEA), or 3-hydroxy-3-methyl-2-butanone. Halogen compound includes chloroform, dichloromethane, or 1-chlorobutane. Amide can be dimethylformamide (DMF), dimethylacetamide (DMA), or methylcyclohexane (MCH).

To improve coating, the dye of the invention may be dissolved with a polymer in the organic solvent. In a preferred embodiment, the polymer is chitin, polyvinyl resin (such as polyvinyl butyral), or cellulose (such as cellulose ester, cellulose acetate, or cellulose acetate butyrate).

The fabrication of the recording layer also includes roll-pressing, dipping, inkjet printing, and evaporation coating, however, the spin coating is preferable.

In HD-DVD-R process, the two substrates are adhered by screen printing, thermal bonding, tape adhering, or other suitable method.

In BDR structure, a dielectric layer can be optionally disposed between the recording layer 23 and the cover layer 24, of $ZnS$—$SiO_2$, $ZnS$, $AlN$, $SiN$, $SiC$, or other suitable dielectric materials.

The dyes of the invention can be used with other dyes, such as azo metal chelate dye, cyanine, phthalocyanine, and the like. Combinations comprising the dyes of the invention can be applied in the recording layer of the blue ray disk. The mixing ratio of the dyes of the invention/other dyes is 1:99 to 99:1.

The dyes of the invention are well dissolved in the organic solvent, for example with solubility in 2,2,3,3-tetrafluro-propan-1-ol exceeding 1.0%. In addition, the dyes have good coating property on the substrate or the reflective layer. The dyes have an absorption coefficient ($\in$) exceeding $5*10^4$ in wavelength of 300-500 nm, and having a partial response signal-to-noise ratio (PRSNR) exceeding 12.

EXAMPLES

Example 1

Synthesis Dye I-1

4.21 g (0.02 mole) of A-1, and 1.48 g (0.01 mole) of triethyl orthoformate were dissolved in methyl alcohol (40 mL) and reflux overnight. The resulting product was extracted by sodium carbonate. After filtering and drying, 2.13 g of orange yellow solid (I-1) was formed with 47% yield. This reaction is shown in formula VII:

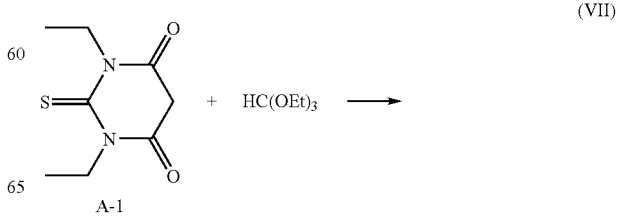

(VII)

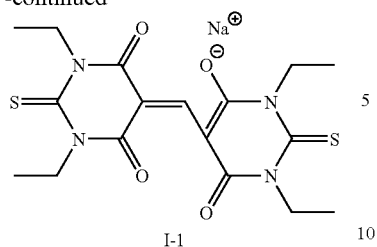

I-1

Example 2

Synthesis Dye I-2

4.32 g (0.01 mole) of I-1 and 3.01 g (0.01 mole) of 1,2,3,4-tetramethyl-3H-indolium iodide were dissolved in methyl alcohol (40 mL) and stirred for 1 hour at 40° C. After filtering and drying, 3.28 g of pink solid (I-2) was formed with 56.3% yield. This reaction is shown in formula VIII:

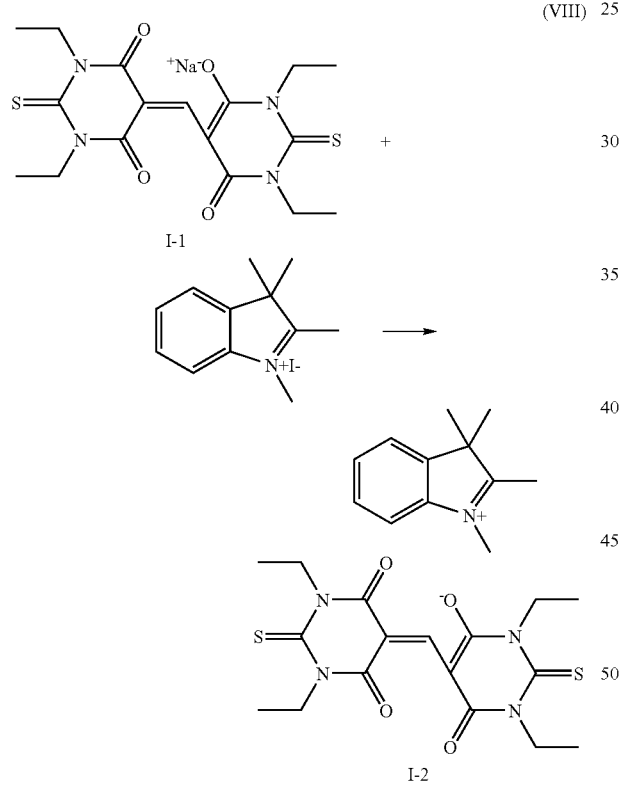

Example 3

Synthesis Dye V-1

4.05 g (0.02 mole) of B-1 and 1.48 g (0.01 mole) of triethyl orthoformate were dissolved in methyl alcohol (40 mL), and reflux overnight. The resulting product was extracted by sodium carbonate. After filtering and drying, 9.36 g of yellowish brown solid (V-1) was formed with 62.5% yield. This reaction is shown in formula IX:

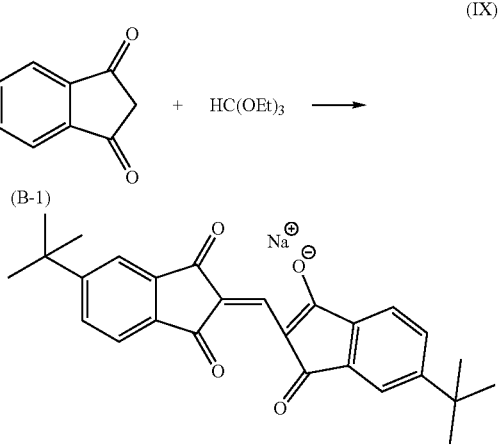

Example 4

Synthesis Dye V-2

4.36 g (0.01 mole) of V-1 and 3.01 g (0.01 mole) of 1,2,3,4-tetramethyl-3H-indolium iodide were dissolved in methyl alcohol (40 mL) and stirred for 1 hour at 40° C. After filtering and drying, 4.27 g of dark brown solid (V-2) was formed with 72.7% yield. This reaction is shown in formula X:

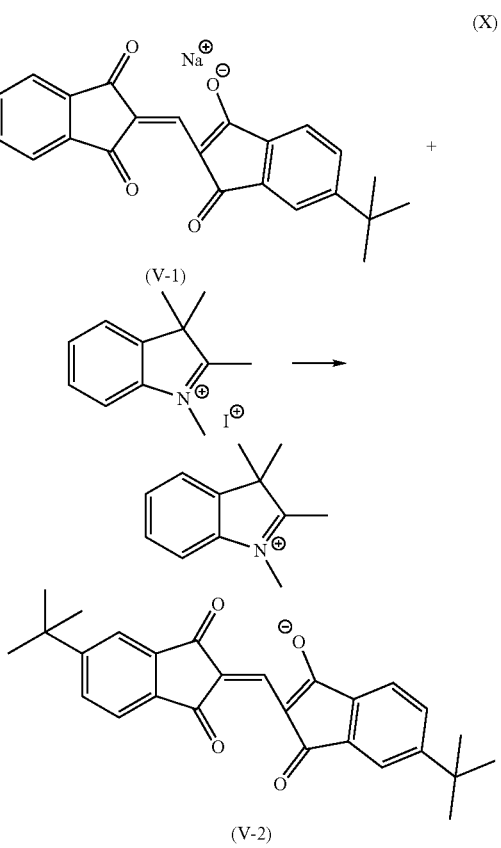

Example 5

Optical Measurement of the Dyes

Measured by UV-visible spectrophotometer, the optical properties (e.g. maximum absorption wavelength in solution) of the dyes of the preferred embodiments are tabulated in Table 1. In Table 1, dye I-2 has a maximum absorption wavelength of 489 nm in methanol solution, and dye V-2 has a maximum absorption wavelength of 493 nm in methanol solution, respectively.

TABLE 1

| Serial No. of Dyes | Structure | Max absorption wavelength in MeOH solution | $(\epsilon)\ (* 10^4)$ |
|---|---|---|---|
| I-2 | | 489 | 15.4 |
| I-a | | 460 | 4.98 |
| I-b | | 495 | 8.4 |

TABLE 1-continued

| Serial No. of Dyes | Structure | Max absorption wavelength in MeOH solution | $(\epsilon)\ (* 10^4)$ |
|---|---|---|---|
| I-c | | 460 | 6.22 |
| I-d | | 460<br>1067 | 6.58<br>5.11 |
| I-e | | 471 | 7.58 |

TABLE 1-continued
| Serial No. of Dyes | Structure | Max absorption wavelength in MeOH solution | $(\epsilon)\ (*\ 10^4)$ |
|---|---|---|---|
| I-f | 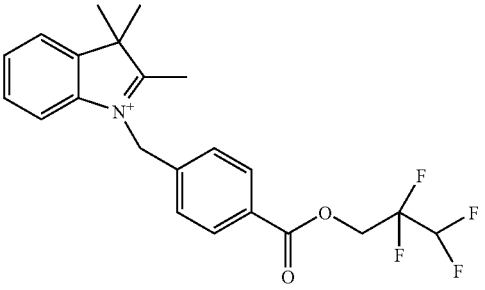 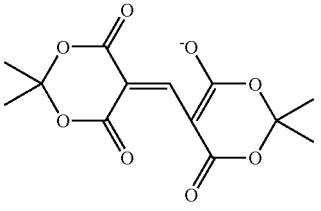 | 448 | 8.08 |
| I-g | 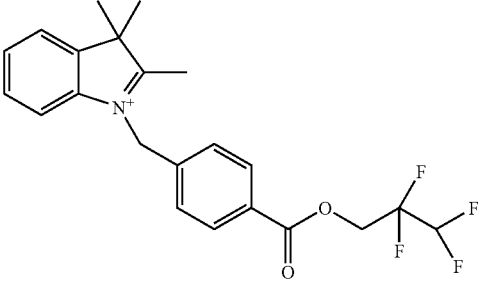 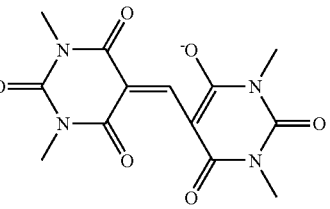 | 463 | 12.99 |
| I-h | 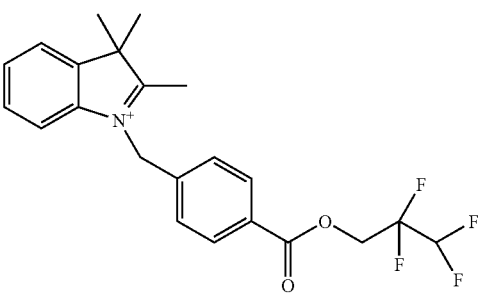 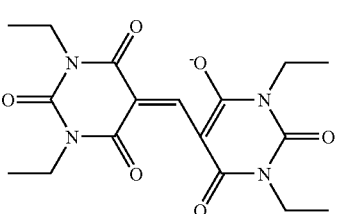 | 462 | 18.5 |

TABLE 1-continued

| Serial No. of Dyes | Structure | Max absorption wavelength in MeOH solution | (ε) (* 10⁴) |
|---|---|---|---|
| I-i | | 464 | 12.2 |
| I-j | | 459 | 12.1 |
| I-k | | 460 | 11.8 |

TABLE 1-continued

| Serial No. of Dyes | Structure | Max absorption wavelength in MeOH solution | $(\epsilon)\,(*\,10^4)$ |
|---|---|---|---|
| I-l | | 461 | 12.5 |
| I-m | | 472 | 10.7 |
| I-n | | 462 | 11.5 |

TABLE 1-continued
| Serial No. of Dyes | Structure | Max absorption wavelength in MeOH solution | (ε) (* 10⁴) |
|---|---|---|---|
| V-2 | 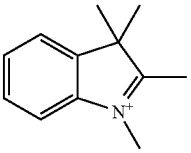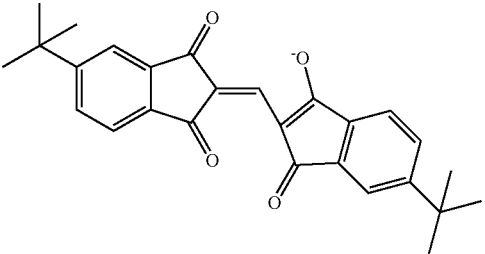 | 493 | 19.1 |
| V-a | 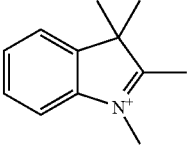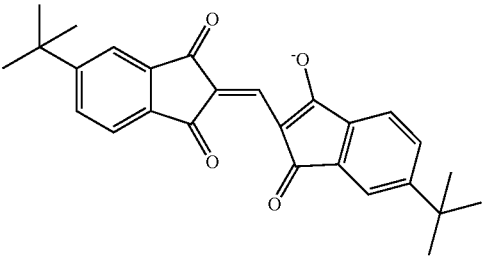 | 461 | 6.41 |
| V-b | 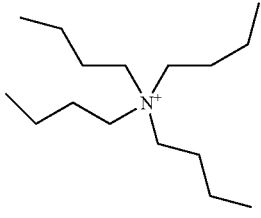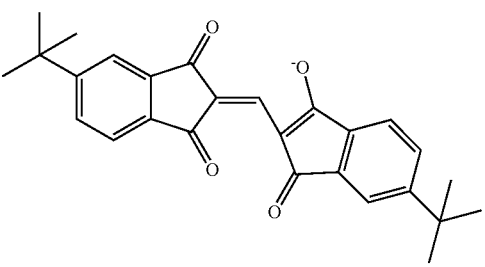 | 492 | 9.72 |

TABLE 1-continued

| Serial No. of Dyes | Structure | Max absorption wavelength in MeOH solution | $(\epsilon)\ (*\ 10^4)$ |
|---|---|---|---|
| V-c | | 461<br>1067 | 6.8<br>3.8 |
| | | | |
| V-d | | 463 | 8.45 |

TABLE 1-continued

| Serial No. of Dyes | Structure | Max absorption wavelength in MeOH solution | $(\epsilon)\,(*\,10^4)$ |
|---|---|---|---|
| V-e | 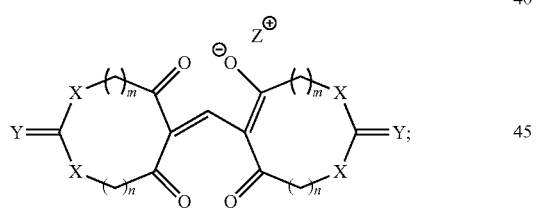 | 490 | 10.35 |

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A dye, consisting of a general formula:

[structure]

wherein m, n is independently selected from integers 0-3;
X is oxygen, sulfur, N—$R_1$, or C—$R_2R_3$;
Y is oxygen or sulfur;
each of $R_1$, $R_2$, and $R_3$, being the same or different, is hydrogen, alkyl, substituted alkyl, cycloalkyl, substituted cycloalkyl, alkoxy, substituted alkoxy, phenyl, substituted phenyl, benzyl, substituted benzyl, halogen; and
$Z^{\oplus}$ is an indole or benzothiazole cation,
wherein the indole cation has a formula:

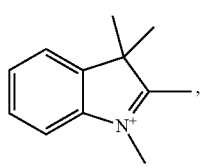

-continued

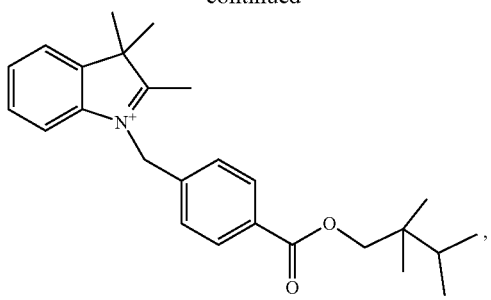

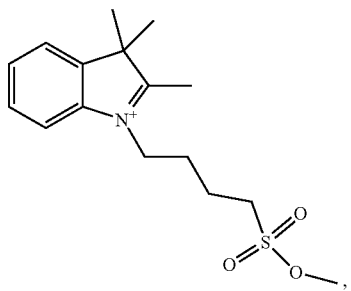

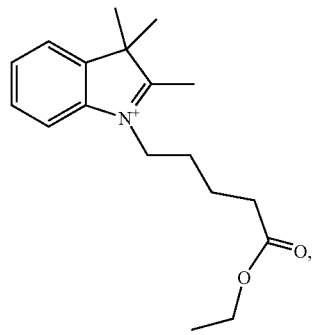

25

-continued

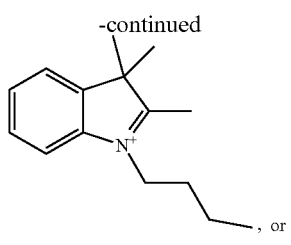
, or

[structure with indole cation and benzoate with fluorinated chain]
, and wherein the benzothiazole cation has a formula:

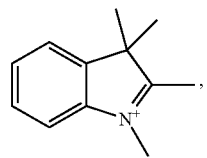

2. A high density optical recording medium, comprising:
a substrate; and
a recording layer on the substrate capable of recording information by irradiation by a laser beam with a wavelength of 300 to 500 nm;
wherein the recording layer comprises the dye as claimed in claim 1.

3. The high density optical recording medium as claimed in claim 2, wherein the recording layer further comprises azo metal chelate dye, cyanine, or phthalocyanine.

4. A dye, consisting of a general formula:

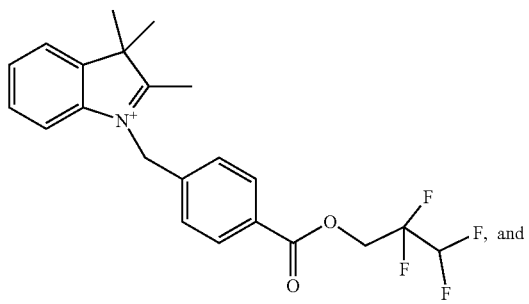

wherein m, n is independently selected from integers 0-3;
X is oxygen, sulfur, N—$R_4$, or C—$R_5R_6$;
each of $R_4$, $R_5$, $R_6$, $R_7$, and $R_8$, being the same or different, is hydrogen, alkyl, substituted alkyl, cycloalkyl, substituted cycloalkyl, alkoxy, substituted alkoxy, phenyl, substituted phenyl, benzyl, substituted benzyl, halogen; and
$Z^\oplus$ is an indole or benzothiazole cation,

26 wherein the indole cation has a formula:

[series of indole cation structures with various N-substituents including methyl, benzyl ester groups, sulfonate chain, ethyl ester chain, butyl, and fluorinated benzyl ester]
, and wherein the benzothiazole cation has a formula:

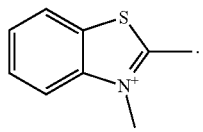

5. A high density optical recording medium, comprising:
a substrate; and
a recording layer on the substrate capable of recording information by irradiation by a laser beam with a wavelength of 300 to 500 nm;
wherein the recording layer comprises the dye as claimed in claim 4.

6. The high density optical recording medium as claimed in claim 5, wherein the recording layer further comprises azo metal chelate dye, cyanine, or phthalocyanine.

7. A dye, consisting of a general formula:

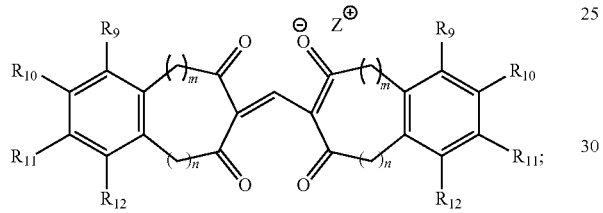

wherein m, n is independently selected from integers 0-3;
each of $R_9$, $R_{10}$, $R_{11}$, $R_{12}$, being the same or different, is hydrogen, alkyl, substituted alkyl, cycloalkyl, substituted cycloalkyl, alkoxy, substituted alkoxy, phenyl, substituted phenyl, benzyl, substituted benzyl, halogen, nitro, carboxyl ester, keto, sulfonyl, sulfonyl ester; and
$Z^\oplus$ is an indole or benzothiazole cation,
wherein the indole cation has a formula:

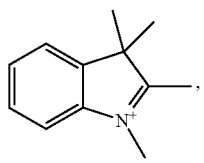

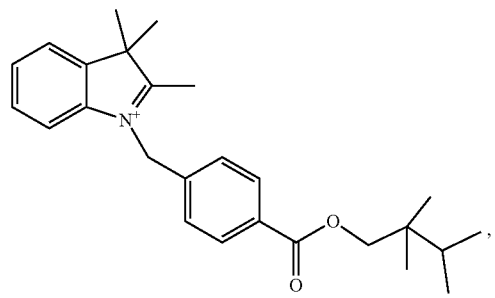

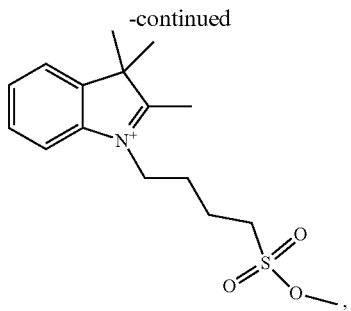

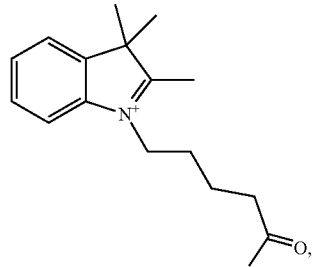

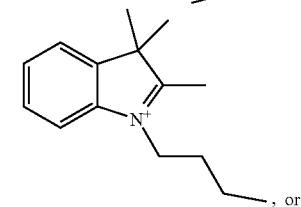

, or

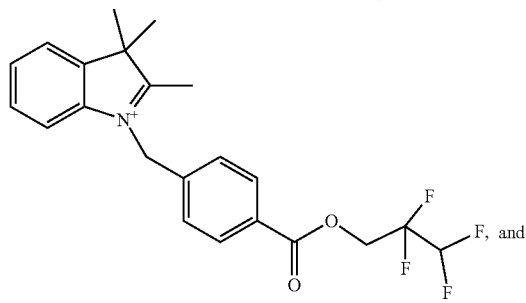

F, and wherein the benzothiazole cation has a formula:

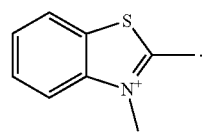

8. A high density optical recording medium, comprising:
a substrate; and
a recording layer on the substrate capable of recording information by irradiation by a laser beam with a wavelength of 300 to 500 nm;
wherein the recording layer comprises the dye as claimed in claim 7.

9. The high density optical recording medium as claimed in claim 8, wherein the recording layer further comprises azo metal chelate dye, cyanine, or phthalocyanine.

* * * * *